United States Patent
Yamano et al.

(10) Patent No.: US 6,190,772 B1
(45) Date of Patent: Feb. 20, 2001

(54) FLAME-RETARDANT, WEAR-RESISTANT RESIN COMPOSITION, USEFUL FOR ELECTRICAL INSULATION

(75) Inventors: Yoshiaki Yamano; Hiroshi Fujimoto, both of Yokkaichi (JP)

(73) Assignee: Sumitomo Wiring Systems, Ltd., Mie (JP)

( * ) Notice: Under 35 U.S.C. 154(b), the term of this patent shall be extended for 0 days.

(21) Appl. No.: 09/347,522

(22) Filed: Jul. 6, 1999

(30) Foreign Application Priority Data

Jul. 14, 1998 (JP) .................................................. 10-199201

(51) Int. Cl.⁷ .............................. B32B 15/00; H01B 7/00; C08K 3/10
(52) U.S. Cl. ........................... 428/379; 428/372; 525/240; 524/437; 174/110 PM; 174/110 SR; 174/121 AR
(58) Field of Search ............................. 525/240; 428/379, 428/372; 174/110 PM, 110 SR, 121 A; 524/437

(56) References Cited

U.S. PATENT DOCUMENTS

| | | | |
|---|---|---|---|
| 4,088,713 | * | 5/1978 | Herman et al. .................... 260/897 |
| 4,198,327 | * | 4/1980 | Matsumoto et al. .................... 260/4 |
| 4,562,230 | * | 12/1985 | Fukui et al. ............................ 525/74 |
| 4,843,129 | * | 6/1989 | Spenadel et al. .................... 525/240 |
| 4,963,612 | * | 10/1990 | Braga et al. .......................... 524/477 |
| 5,011,891 | * | 4/1991 | Spenadel et al. .................... 525/211 |
| 5,358,786 | | 10/1994 | Ishikawa et al. . |
| 5,378,856 | | 1/1995 | Allen . |

FOREIGN PATENT DOCUMENTS

| | | |
|---|---|---|
| 0370517 | 5/1990 | (EP) . |
| 5-301996 | 11/1993 | (JP) . |
| 7-110912 | 11/1995 | (JP) . |
| 9-31271 | 2/1997 | (JP) . |

* cited by examiner

Primary Examiner—William Krynski
Assistant Examiner—J. M. Gray
(74) Attorney, Agent, or Firm—Oliff & Berridge, PLC

(57) ABSTRACT

A flame-retardant, wear-resistant resin composition includes a polymer composition and at least one metal hydroxide. The polymer composition consists of (a) at least one propylene-ethylene block copolymer, and (b) at least one polyolefin-rubber elastomer including polyolefin as a hard segment and rubber as a soft segment. The resin composition consists of 10 to 80% by weight of the component (a), and 20 to 90% by weight of the component (b). The metal hydroxide is present in the resin composition in an amount in the range of 30 to 300 parts by weight per 100 parts by weight of the polymer composition. A good balance of properties can be obtained.

9 Claims, 1 Drawing Sheet

FLAME-RETARDANT, WEAR-RESISTANT RESIN COMPOSITION, USEFUL FOR ELECTRICAL INSULATION

BACKGROUND OF THE INVENTION

1. Field of Invention

The present invention relates to a flame-retardant wear-resistant (abrasion resistant) resin composition useful as an electrically insulating material, particularly for electric wires (cables) such as automobile electric wires. The resin composition of the invention does not generate harmful halogen-containing gas when burned and provides satisfactory characteristics such as flame resistance, wear-resistance, tensile strength, flexibility, pliability, etc., for electric wire insulation. The invention also relates to a method of preparing such a resin composition.

2. Description of Related Art

As insulating coating materials for electric wires (cables), polyvinyl chloride (PVC) is currently being used in general because it is easily obtainable and adaptable according to the purpose of use from heat-resistance to cold-resistance, and from hard to soft quality, by selecting the mixing materials, and can give the characteristics required for coating materials of excellent insulating performance, flame resistance, oil resistance, ozone resistance and water resistance.

However, because PVC is a polymer containing halogens, it generates harmful gas such as hydrogen chloride when burning, which may cause secondary damage such as metal corrosion and the like in an electric distribution system due to hydrogen chloride gas resulting from burning of the cable.

In addition, due to the recent increased recognition of environmental protection, reduction of industrial waste such as plastic materials, and recycling, even with PVC used for insulation material for automobile-use wire harness cables, hydrogen chloride gas resulting from incineration has become recognized as an important problem. Therefore, a non-halogen flame-retardant insulation material which does not generate harmful halogen gas on burning is currently sought.

At present, as non-halogen, flame-retarding material, a mixture in which a metallic hydroxide blended with a polyolefin resin is typical. But this material has inferior pliability and flexibility compared with PVC. Also, it requires blending with a large amount of metallic hydroxide which is the flame-resisting agent in order to obtain necessary flame retardance. However, as the amount of flame-resisting agent increases, mechanical strength such as wear-resistance and tensile strength is largely decreased, and problems of inferior coldproofing, flexibility at lower temperature and chalking resistance arise.

The decrease in wear-resistance is particularly significant for insulating materials of thin wall-thickness, e.g. 0.1–1 mm, used in automobile electric cables.

A flame-retarding, wear-resistant resin composition using metallic hydroxide as a flame-resisting agent and including a mixture of polyolefin of low crystallinity and thermoplastic elastomer as polymer components is proposed in JP-A-7-110912. This disclosure seeks to achieve flame-resistivity and tensile strength by obtaining heat resistance and flexibility with a thermoplastic elastomer blend, using a polyolefin of low crystallinity which gives good dispersibility of the metal hydroxides.

However, it is difficult to satisfy the flame resistance and wear-resistance requirements in a well balanced manner, due to larger amounts of flame-resisting agent blended for securing the flame resistance which consequently reduces wear-resistance.

In addition, JP-A-9-31271 discloses use of two ethylene-olefin (for example, propylene) copolymers which are different in melt flow rate, density and molecular weight distribution, in a blend with a flame-resisting agent. Dispersibility of the flame-resisting agent is obtained by use of low-density ethylene-olefin (for instance, propylene) copolymer, and wear-resistance by use of medium-density ethylene-olefin (for instance, propylene) copolymer. But, even with this resin composition, increasing the ratio of the low-density ethylene-olefin copolymer becomes necessary in order to blend sufficient flame-resisting agent, which also leads to a difficulty in balancing the flame-resistance against wear-resistance. Furthermore, with this resin composition, increasing the content of medium-density ethylene-olefin copolymer in order to increase wear-resistance leads to a decrease in elongation, thereby not providing suitable flexibility as an insulation material for electric wires.

There are other proposals in the art. U.S. Pat. No. 5,378,856 describes an insulating coating for a conductor wire compound comprised primarily of a high density polyethylene (100 parts), an ethylene-vinyl acetate polymer (20–100 parts), a low density polyethylene (0–60 parts) and a flame-retardant such as aluminium hydroxide. EP-A-370517 likewise describes a fire-retardant composition, useful as an insulating coating, comprising a thermoplastic resin, particularly an ethylene/ethyl acrylic copolymer (e.g., 100 parts), a low-density ethylene/1-hexene copolymer modified with a maleic anhydroxide (e.g., 30 parts) and magnesium hydroxide (e.g., 200 parts).

SUMMARY OF THE INVENTION

The present invention has as an object to avoid or reduce the above problems and, particularly, to provide a flame-retardant, wear-resistant resin composition, useful as insulation for electric wires (cable) for automobile use. The resin composition achieves such desirable characteristics as mechanical strength, wear-resistance, flexibility, etc., with good dispersibility of a flame-resisting agent and sufficient flame resistance.

According to an aspect of the invention there is provided a flame-retardant, wear-resistant resin composition comprising a polymer composition and at least one metal hydroxide, the polymer composition consisting of components (a) and (b):

(a) at least one propylene-ethylene block copolymer, and
(b) at least one polyolefin-rubber elastomer including polyolefin as a hard segment and rubber as a soft segment, and wherein:
   component (a) in the polymer composition is present in an amount in the range of 10 to 80% by weight, and component (b) is present in the polymer composition in an amount in the range of 20 to 90% by weight, and
   the metal hydroxide or total metal hydroxides being in an amount in the range of 30 to 300 parts by weight per 100 parts by weight of the polymer composition.

According to an embodiment of the invention there is also provided an electric wire, e.g., one for use in an automobile, having an electrical conductor and the above resin composition as an insulating material around the conductor.

According to another aspect of the invention there is provided a method of preparing a flame-retardant, wear-resistant resin composition, comprising forming a blend of the following components (a), (b) and (c) which are:

(a) at least one propylene-ethylene block copolymer,
(b) at least one polyolefin-rubber elastomer including polyolefm as a hard segment and rubber as a soft segment, and (c) at least one metal hydroxide, the components (a) and (b) forming in the blend a polymer composition in which component (a) is in an amount in the range 10 to 80% by weight, component (b) is in an amount of 20 to 90% by weight, and component (c) being present in the blend in an amount in the range of 30 to 300 parts by weight per 100 parts by weight of the polymer composition.

Preferably, the polyolefin-rubber elastomer is a polypropylene/ethylene-propylene-rubber elastomer. Preferably, the metallic hydroxide has a particle diameter of 0.1–5 µm (average particle size).

DETAILED DESCRIPTION OF PREFERRED EMBODIMENTS

Figure 1:
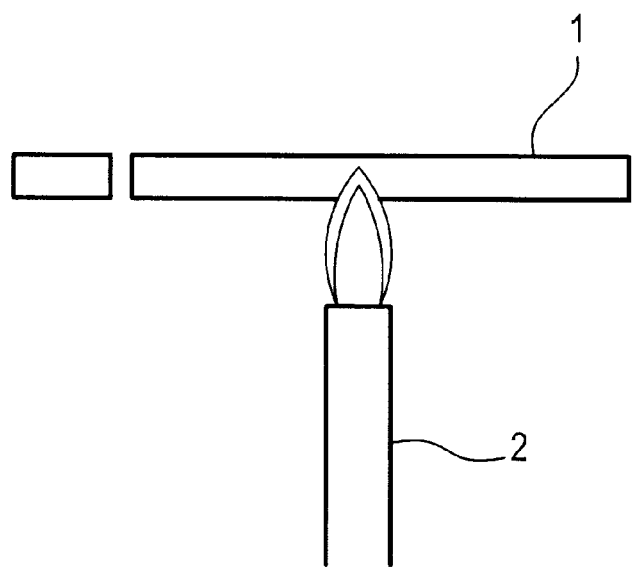
FIG. 1 shows a flame resistance test.

The resin composition of the present invention is a resin composition comprising a metallic hydroxide as a flame-resisting agent, having as a polymer composition a propylene-ethylene block copolymer and polyolefin-rubber elastomer. These materials do not contain a halogen.

The propylene-ethylene block copolymer (P-E block copolymer) is a copolymer which in its molecular chains comprises polyethylene blocks and polypropylene blocks. Typically, this P-E block copolymer may comprise random zones in which ethylene and propylene are polymerized at random in addition to polyethylene blocks and polypropylene blocks. Propylene-ethylene copolymers comprise block copolymers and random copolymers (a copolymer consisting of only random zones), when broadly classified. The propylene-ethylene random copolymer (P-E random copolymer) is less rigid and inferior in wear-resistance, whereas the P-E block copolymer has a crystallinity higher than that of the P-E random copolymer and has excellent wear-resistance owing to its hardness, but has a lower crystallinity and is less hard than the propylene homopolymer (isotactic type) and is thus favorable in terms of pliability and flexibility. In addition, the P-E block copolymer is superior in dispersibility of the flame-resisting agent than the ethylene homopolymer or propylene homopolymer. Therefore, reduction in wear-resistance and strength due to blending of the flame-resisting agent can be minimized because the flame resistance can be achieved by the blending of only a necessary amount of flame-resisting agent required for maintaining flame resistance instead of blending an unnecessary larger amount of flame-resisting agent.

There is no special restriction on the kind of P-E block copolymers used in the present invention, permitting the use of those commercially available. Mixtures of more than one P-E block copolymer may be used, as well as a single P-E block copolymer.

The polyolefin-rubber elastomer as used in the present invention comprises polyolefin as a hard polymeric segment, and rubber as a soft polymeric segment. As used herein, a "segment" is a segment in the polymer molecule. Such elastomers are known as polyolefin-rubber thermoplastic elastomers. As the polyolefin, polyethylene (PE) and polypropylene (PP) are several examples. As the rubber material, ethylene propylene rubber (EPM), ethylene propylene diene terpolymer rubber (EPDM), polybutadiene, polyisoprene and hydrogenated polybutadiene are examples. Polyolefin-rubber type thermoplastic elastomers may be used which are obtainable by various combinations of the above-mentioned materials.

PE-EPM elastomer, PE-EPDM elastomer, PP-EPM elastomer, PP-EPDM elastomer, PE-polybutadiene elastomer, PE-polyisoprene elastomer and PP-polybutadiene elastomer, and the like are given as examples, but any combination may be used, and a single or multiple elastomers may be employed. However, in consideration of compatibility with the P-E block copolymer, hardness, and mechanical strength, polypropylene is preferable as the polyolefin, and EPM is preferable as the rubber. Therefore, for the polyolefin-rubber elastomer, a polypropylene/ethylene-propylene-rubber elastomer (PP-EPM elastomer) is preferably used.

The polyolefin-rubber elastomer provides the insulation material with pliability and flexibility, inhibiting the chalking on bending which is a defect of propylene polymer. Furthermore, such an elastomer is excellent in dispersibility of the flame-resisting agent, like the ethylene-propylene block copolymer, which allows flame resistance to be obtained by blending the necessary amount of flame resisting agent, avoiding excessive reduction of wear-resistance and strength by the blending of the flame resisting agent.

The mixing ratio of the block copolymer and elastomer in the polymer is 20–90 percent by weight of the polyolefin-rubber elastomer to 80–10 percent by weight of the propylene-ethylene block copolymer. It is preferable to choose within these ranges according to the insulating wall thickness of the electric wire. That is, when the insulating wall-thickness is comparatively thick, it is desirable to choose by particularly taking the flame-resistance and flexibility into consideration, because the requirement for wear-resistance is not so severe due to the time required until the insulating material is frictionally worn out. That is, it is desirable to increase the content of thermoplastic elastomer. In contrast, in case of the insulating wall-thickness being thin, there is little problem for the flexibility of cables. But, when the requirement for wear-resistance increases, a larger proportion of propylene-ethylene block copolymer is desired.

Typically, bivalent or trivalent metal hydroxides are used as the metal hydroxide. Magnesium hydroxide, aluminium hydroxide, calcium hydroxide, and the like can preferably be used. Mixtures may be used.

The particle diameter of the metal hydroxide is not restricted, but it is preferable that the average particle diameter is 0.1–5 µm for dispersibility into the polymer, workability, wire characteristics, and the like. This is because, with a particle diameter less than 0.1 µm, handling the powder tends to be difficult, whereas a particle diameter of more than 5 µm tends to decrease the dispersibility into the polymer.

The metal hydroxide can be used as it is, but it is also possible to use a metal hydroxide that is surface treated with silane coupling agent, titanate coupling agent, fatty acid, or its metallic salt for the purpose of preventing cohesion, improving dispersibility to the polymer and improving adhesive property to the polymer, or other like purposes.

The mixing amount of the metallic hydroxide in the resin composition of the present invention is 30–300 parts by weight, more preferably 50–150 parts by weight, per 100 parts by weight of the polymer composition (the sum of P-E block copolymer and elastomer). At below 30 parts by weight, flame retardance may not be achieved, while exceeding 300 parts by weight may decrease too much some physical properties such as elongation, tensile strength, and wear-resistance.

As is conventional, in the resin composition of the present invention appropriate amounts of one or more blending agents such as antioxidant, crosslinking auxiliary, copper inhibitor, colorant, lubricant and the like may be included in the resin composition within a range that does not cause characteristics such as wear-resistance, flame retardance and strength to be unsatisfactorily decreased.

By using the flame-retardant, wear-resistant resin composition of the present invention as insulating material in an electric wire, the flame resistance, wear-resistance, strength and flexibility that are required for automobile electric wires can be achieved.

Non-limitative examples of the invention, and comparative examples, are now described.

The methods of evaluation used in the examples below are as follows:

1. Flame Resistance

The evaluation was carried out using the JASO D611 (Japanese Automobile Standard) horizontal burning test as shown in FIG. 1. With a Bunsen burner 2 of an inside diameter of about 10 mm, and adjusting the length of the reducing flame to about 35 mm, the test specimen 1 is held at a horizontal position and subjected to the flame at the lower side of the center of the specimen for 30 seconds until it starts burning by itself. Then, the flame is removed. A test specimen which self-extinguishes within 15 seconds is considered preferable.

2. Tensile Strength

This test was also carried out using the test method of JASO D611. For a dumbbell specimen and a tubular test specimen, loads were measured when the test specimens were broken by use of a pendulum type tensile testing device. The stretching speed was 300 mm/min for dumbbell specimens and 500 mm/min for tubular specimens. The greater the test values, the higher the tensile strength. The tensile strength unit is MPa. For example more than 15.7 MPa is required for electric wires.

3. Elongation

In the above-described tensile strength test, measurements were made of elongation (%) over the original length when test specimens were broken. The greater the elongation, the greater is the flexibility of the insulating material.

4. Wear-resistance (Abrasion resistance)

Figure 2:
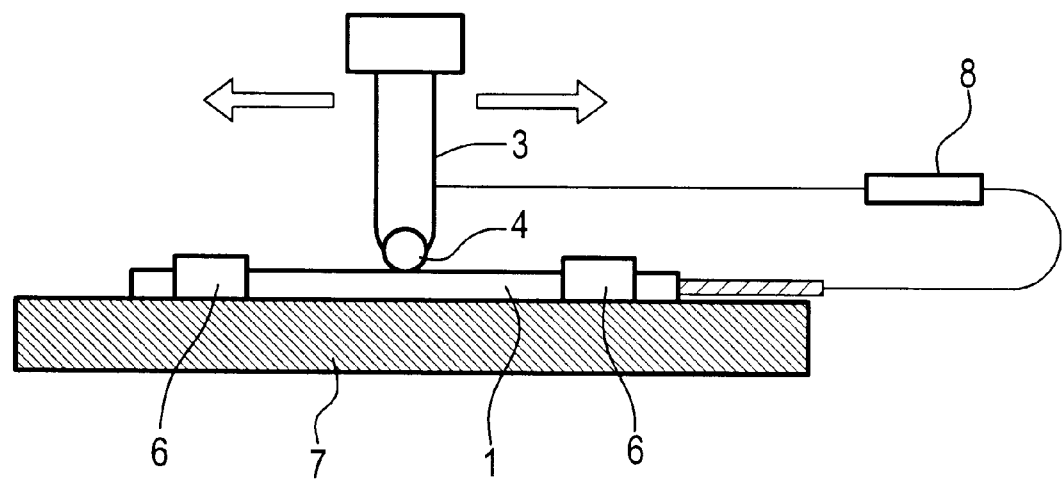
FIG. 2 shows a wear-resistance (antifriction) test.

Evaluation was made by a reciprocating test as shown in FIG. 2. A load of 7N was applied using a metal plunger 3 having a tip 4, of diameter of 0.45±0.015 mm and made of a type-C hard steel wire specified in JIS G3521 (hard steel wire), in contact with the sample electric wire 1 which is held by clamps 6 on a base 7.

Then, this metal plunger 3 is reciprocated along the wire 1 at a speed of 50–60 times/min with a stroke of 10 mm, and the number of reciprocations was measured until the hard steel wire makes contact with the electric conductor of the wire 1, using a detector indicated by 8.

After measuring at one point, the test specimen 1 was moved by 100 mm and rotated by 90° in a clockwise direction, and then the same test was repeated. The test specimen was considered acceptable when the number of reciprocations exceeded 300 in every test.

5. Flexibility

The flexibility was evaluated by hand feeling when an electric wire was bent.

Examples:

On the surface of a conductor (twisted wire including seven soft copper wires, each having a diameter of 0.32 mm) having a cross-section of 0.5 $mm^2$, a resin composition having a blended composition as shown in Table 1 below was extruded by an extruder in order to make the insulation material wall thickness about 0.3 mm. Wire specimens No. 1 to 7 were made with different compositions of the insulating materials. Specimens 1 and 2 are embodiments of the present invention, and 3 to 7 are comparative examples.

Extrusion conditions that were used are: die temperature of 210° C.; cylinder temperature of 200° C.; line speed of 300 cm/min. The P-E block copolymer was MK 640 made by Tokuyama Corp., and the polypropylene-ethylene propylene rubber thermoplastic elastomer (PP-EPM elastomer) was P.E.R. R410E made by Tokuyama Corp. Furthermore, as the propylene homopolymer (PP homopolymer), an isotactic homopolymer having a high crystallinity was used. The magnesium hydroxide had an average particle diameter of 1 mm and was surface-treated with stearic acid. For a lubricant, zinc stearate was used, and for an antioxidant, a phenol-type Tominox TT (made by Yoshitomi Pharmaceutical) was used. These materials were blended together so as to be thoroughly mixed, with uniform distribution of the magnesium hydroxide, in a conventional manner before extrusion.

For each wire produced, evaluations were made for flame resistance, wear-resistance, tensile strength, elongation and flexibility using the above-described evaluation methods. The evaluation results are shown in Table 1 together with each blended composition.

TABLE 1

|  | Present Invention | | Comparative Example | | | | |
| --- | --- | --- | --- | --- | --- | --- | --- |
| Cable Specimen No. | 1 | 2 | 1 | 2 | 3 | 4 | 5 |
| Blend |  |  |  |  |  |  |  |
| P-E block copolymer | 80 | 10 | — | — | — | 90 | 50 |
| PP homopolymer | — | — | 50 | — | — | — | — |
| PE random copolymer | — | — | — | 50 | — | — | — |
| High density PE | — | — | — | — | 50 | — | — |
| Low density PE | — | — | — | — | 50 | — | — |
| PP-EPM elastomer | 20 | 90 | 50 | 50 | — | 10 | 50 |
| Magnesium hydroxide | 50 | 150 | 100 | 100 | 20 | 200 | 400 |
| Antioxidant material | 1 | 1 | 1 | 1 | 1 | 1 | 1 |
| Lubricant | 1 | 1 | 1 | 1 | 1 | 1 | 1 |
| Total of Contents | 202 | 252 | 202 | 202 | 122 | 302 | 502 |
| Evaluation |  |  |  |  |  |  |  |
| Flame resistance | Good | Good | Good | Good | Bad | Good | Good |
| Wear-resistance (Antifriction) (Times) | 1250 | 350 | 2310 | 89 | 220 | 510 | 63 |
| Tensile strength (MPa) | 35 | 16 | 38 | 15 | 22 | 43 | 8 |
| Elongation (%) | 670 | 380 | 80 | 690 | 570 | 380 | 20 |
| Flexibility | Good | Good | Bad | Good | Good | Bad | Good |

As shown in Table 1, for comparative example 1, when the polymer used in combination with the elastomer is a hard PP polymer with high crystallinity, the wear-resistance is better, while the flexibility becomes degraded as the elongation decreases.

In contrast, as shown for comparative example 2, when the polymer used in combination with the elastomer is of a soft P-E random copolymer having a lower crystallinity, elongation becomes larger with flexibility being excellent, but wear-resistance becomes too low. Comparative example 3 shows that a blend of a low-density PE and high density PE results in insufficient wear-resistance. It is also seen from comparative example 3 that, when the amount of flame-resisting agent is about 20 parts by weight, the flame resistance requirement cannot be achieved, whereas, when the content is 400 parts by weight, the strength characteristics such as wear-resistance and tensile strength are decreased too much, and also elongation is reduced (comparative example 5).

Furthermore, it is seen from comparative example 4 that even for a combination of P-E block copolymer and PP-EPM elastomer, the rigidity becomes too large so that flexibility is defective when the amount of P-E block copolymer of the polymer composition becomes 90% by weight.

While specific examples have been here described, the invention is not limited by them but can be practiced within the full scope of the inventive concept herein disclosed.

What is claimed is:

1. A flame-retardant, wear-resistant resin composition comprising a polymer composition and at least one metal hydroxide, the polymer composition consisting of the components (a) and (b):
   (a) at least one propylene-ethylene block copolymer, and
   (b) at least one polyolefin-rubber elastomer including polyolefin as a hard segment and rubber as a soft segment, and
   wherein the polymer composition consisting of from 10 to 80% by weight of the component (a), from 20 to 90% by weight of the component (b), and
   the at least one metal hydroxide being present in an amount in the range of 30 to 300 parts by weight per 100 parts by weight of the polymer composition.

2. A flame-retardant, wear-resistant resin composition according to claim 1, wherein the component (b) is a polypropylene/ethylene-propylene-rubber elastomer.

3. A flame-retardant, wear-resistant resin composition according to claim 1, wherein the at least one metal hydroxide has a particle diameter in the range of 0.1 to 5 μm.

4. An electric wire, comprising:
   an electrical conductor; and
   an insulating material around the electrical conductor, the insulating material being a flame-retardant, wear-resistant resin composition comprising a polymer composition and at least one metal hydroxide, the polymer composition consisting of the components (a) and (b):
   (a) at least one propylene-ethylene block copolymer, and
   (b) at least one polyolefin-rubber elastomer including polyolefin as a hard segment and rubber as a soft segment,
   wherein the polymer composition consisting of from 10 to 80% by weight of the component (a), from 20 to 90% by weight of the component (b), and
   the at least one metal hydroxide being present in an amount in the range of 30 to 300 parts by weight per 100 parts by weight of the polymer composition.

5. An electric wire according to claim 4, wherein the component (b) is a polypropylene/ethylene-propylene-rubber elastomer.

6. An electric wire according to claim 4, wherein the at least one metal hydroxide has a particle diameter in the range of 0.1 to 5 μm.

7. A method of preparing a flame-retardant, wear-resistant resin composition, comprising forming a blend of the following components (a), (b) and (c):
   (a) at least one propylene-ethylene block copolymer,
   (b) at least one polyolefin-rubber elastomer including polyolefin as a hard segment and rubber as a soft segment, and
   (c) at least one metal hydroxide,
   wherein the blend comprises 10 to 80% by weight of the component (a), 20 to 90% by weight of the component (b), and the component (c) in an amount of 30 to 300 parts by weight per 100 parts by weight of the polymer composition.

8. A method according to claim 7, wherein the component (b) is a polypropylene/ethylene-propylene-rubber elastomer.

9. A method according to claim 7, wherein the at least one metal hydroxide has a particle diameter in the range of 0.1 to 5 μm.

* * * * *